United States Patent Office 3,292,221
Patented Dec. 20, 1966

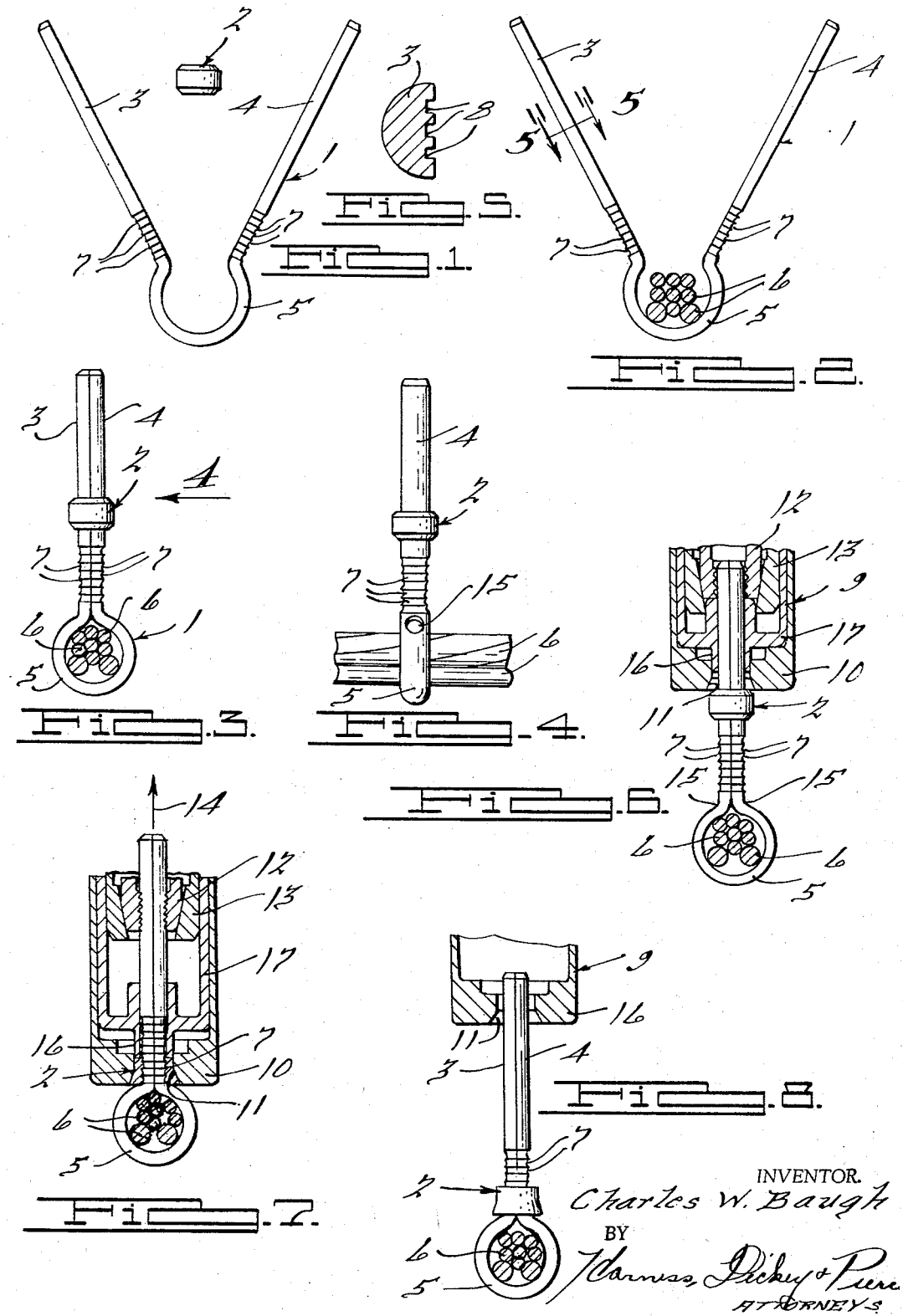

3,292,221
CABLE CLAMPING DEVICE
Charles W. Baugh, St. Clair Shores, Mich., assignor to Huck Manufacturing Company, Detroit, Mich., a corporation of Michigan
Filed Sept. 17, 1964, Ser. No. 397,189
1 Claim. (Cl. 24—123)

The present invention relates to a two-part fastener particularly adapted for clamping wire and rod members together and may generally be termed a cable clamp.

The fastener of the present invention is particularly useful for clamping together a plurality of relatively heavy gauge wires or rods. Such wires or rods extend longitudinally in bunches; and the fastener of the present invention gathers these wires within a generally circular or ring shaped pocked which, for particular uses, is designed so that the diameter of the pocket is slightly less than the effective diameter of the bunched wire rods, so that when the fastener is installed there is considered clamping force exerted on the work. The fastener is formed with locking grooves on external portions thereof, and a tubular collar is disposed over the legs of the fastener and swaged into the grooves so as to provide a permanent lock. During the swaging, the collar is forced against the adjacent portions of the pocket so that a very tight clamping force is exerted on the work.

The fastener may be readily installed by either hand tools or automatic tools, neither of which form a part of the present invention.

One of the objects of the present invention is to provide an improved two-part fastening device in which relatively heavy gauge wire or rods may be readily and effectively clamped together.

Other objects of the invention will become apparent from the following specification, the drawing relating thereto, and the claims hereinafter set forth.

Reference may be had to the drawing in which the preferred embodiment of the present invention is illustrated and wherein:

FIGURE 1 shows the two-part fastening device in end elevation, one of the parts comprising a hairpin shaped member and the other part the collar;

FIG. 2 is an end elevation showing the hairpin shaped member being disposed about the wires or rods to be clamped together, such rods or wires being shown in cross section;

FIG. 3 is an end elevational view similar to FIG. 2 but showing the fastener partly assembled and with the collar disposed thereon;

FIG. 4 is a side elevational view taken in the direction of the arrow 4 of FIG. 3;

FIG. 5 is a cross sectional view taken substantially along the line 5—5 of FIG. 2;

FIG. 6 is a view similar to FIG. 3 and showing the installation tool in position, ready to force the collar down toward the work and swage the collar into the locking grooves provided on the hairpin fastener member;

FIG. 7 is a view similar to FIG. 6 and showing the installation tool at the completion of its driving cycle and with the collar swaged, the collar being shown in cross section; and FIG. 8 is a view similar to FIG. 7 with the tool removed and showing the finally set fastener in elevation with the collar swaged to the hairpin member.

Referring to the drawing, the two-part fastener comprises a hairpin shaped member generally indicated at 1 and a tubular collar generally indicated at 2. The members 1 and 2 are preferably formed of metal such as steel, aluminum, or other metals.

The member 1 is generally hairpin shaped, having a pair of longitudinally extending legs 3 and 4 which are substantially straight and which terminate in an integral portion 5 which is in the shape of an open ring providing a pocket to receive a plurality of wire or rod members 6 therein, as shown in FIG. 2.

The member 1 is originally formed substantially in the shape as shown in FIGS. 1 and 2, that is, the legs 3 and 4 are spread apart and the ring shaped portion 5 is open so that the member 1 may be disposed about the bunched wire or rod members 6 with the rods 6 disposed within the pocket formed by the ring shaped portion 5.

The legs 3 and 4 are each formed with a plurality of longitudinally spaced and external locking grooves 7 which extend transversely of the legs and around the outer surfaces thereof. The locking grooves 7 are disposed adjacent the ring portion 5 and extend toward the ends of the legs 3 an 4 in spaced relation to each other. Such locking grooves are illustrated as only extending partly along the length of the legs, but they may be extended even further if desired.

As shown in FIG. 5, the legs 3 and 4 are substantially semi-circular in cross section with the external surfaces curved and with the facing surfaces substantially flat. The facing surfaces are formed with transversely spaced and longitudinally extending grooves 8 for a purpose to be hereinafter described.

After the fastener is positioned around workpieces 6 which are disposed in the pocket 5, the legs 3 and 4 are brought together by pinchers so that the flat faces of the legs 3 and 4 are in abutting relationship, as shown in FIG. 3. The tubular collar 2, which has a central opening therethrough, as appears in FIG. 7, is disposed over the ends and in embracing relation to the members 3 and 4 toward the locking grooves 7 in the legs. It will be evident that when the legs are so clamped together the abutting projections formed by the grooves 8 in the facing surfaces of both of the legs 3 and 4 will be brought into tight contact and such projections will prevent lateral movement or sliding of the legs 3 and 4 with respect to each other so that they will be held in substantial alignment.

With the wires 6 disposed within the pocket 5 and with the collar 2 applied to the fastener, an installation tool generally indicated a 9 is applied over the projecting ends of the arms 3 and 4 for forcing the collar down over the legs to a position adjacent the ends of the pocket 5 and thereafter swage the collar into the locking grooves, as shown in FIG. 7.

Such an installation tool 9 is well known in the art and is employed in the swaging of collars to fasteners known as lockbolts and also to many blind fasteners. Such an installation tool 9 may be either air or hydraulically operated and comprises an anvil 10 having a frusto conical portion 11 which is adapted to engage and embrace the outer surface of the collar 2.

Gripper jaws 12 are provided in the driving tool which are adapted to be contracted and moved by a jaw contracting and moving sleeve element 13. The gripping jaws 12 may be designed to either grip a smooth surface of the legs 3 and 4 or such legs may be provided with annular gripping grooves. The embodiment illustrated shows the external surface of the legs smooth, and the gripping jaws 12 engage such smooth surfaces and bite into them to provide a pull on the legs in the direction of the arrow 14 in FIG. 7.

In the operation of the driving tool 9 a pull is provided by the gripping jaws and a reaction force in the opposite direction is applied by the anvil 10 so that the collar is pushed from the position shown in FIG. 6 to the position shown in FIG. 7. When the collar can no longer move along the straight legs and abuts against the adjacent corners of the pockets, as indicated at 15, the continued movement of the anvil 10 will then cause the movement of the anvil over the collar swaging the metal of the collar into the locking grooves 7. After the completion of the swage, the operation of the installation mechanism 9 is reversed so as to cause the nose 16 on the sleeve 17 to eject the collar 2 from the anvil and the tool is then removed, as illustrated in FIG. 8.

As shown in FIG. 8, the fastener is finally set and the tool removed with the wire, rod or cable members 6 tightly clamped within the pocket 5.

Formal changes may be made in the specific invention described without departing from the spirit or scope of the invention as set forth in the appended claim.

What is claimed is:

A two-part fastener comprising a hairpin shaped member having a pair of elongated substantially straight facing legs and having an open ring shaped pocket portion intermediate the ends, longitudinally extending grooves formed in the facing surfaces of said legs, transverse locking grooves formed on the exterior of said legs from positions adjacent the ends of said pocket toward the ends of said legs, and a tubular collar member receivable around said legs and adapted to be swaged into said locking grooves adjacent the ends of said pocket portion.

References Cited by the Examiner

UNITED STATES PATENTS

| 269,468 | 12/1882 | Rounds. | |
| 1,446,344 | 2/1923 | Graydon | 24—260 |
| 2,680,774 | 6/1954 | Hoffman | 24—123 |
| 2,902,537 | 9/1959 | Salvi | 174—79 |

FOREIGN PATENTS 781,614    8/1957    Great Britain.

BERNARD A. GELAK, *Primary Examiner.*